R. F. COLEMAN.
CUTTING MACHINE.
APPLICATION FILED MAY 10, 1907.
899,860.
Patented Sept. 29, 1908.
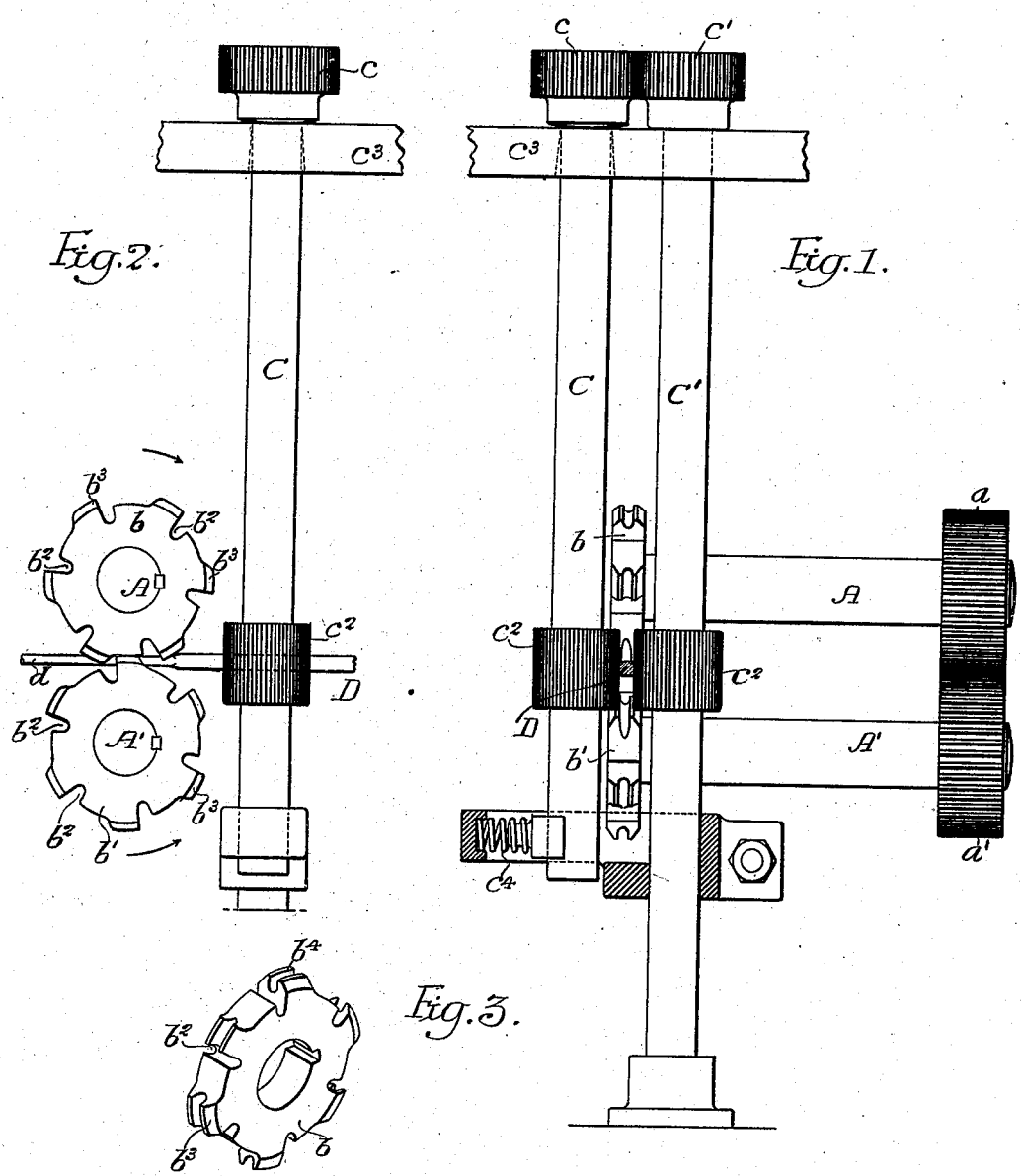
Witnesses:
Augustus B. Coppes
Titus H. Irons
Inventor:
Robert F. Coleman
by his Attorneys,
Howson & Howson

UNITED STATES PATENT OFFICE.

ROBERT F. COLEMAN, OF PHILADELPHIA, PENNSYLVANIA, ASSIGNOR TO J. W. RINGROSE NET COMPANY, OF PHILADELPHIA, PENNSYLVANIA, A CORPORATION OF PENNSYLVANIA.

CUTTING-MACHINE.

No. 899,860.    Specification of Letters Patent.    Patented Sept. 29, 1908.

Application filed May 10, 1907. Serial No. 372,914.

*To all whom it may concern:*

Be it known that I, ROBERT F. COLEMAN, a citizen of the United States, residing in Philadelphia, Pennsylvania, have invented certain Improvements in Cutting-Machines, of which the following is a specification.

One object of my invention is to provide mechanism for forming lengths or strips of circular section from strips of square section; it being particularly desired to so arrange the various parts that such circular section strips may be formed more quickly and inexpensively than has hitherto been possible. I further desire to provide a machine of the above noted type in which strips of square section may be fed to cutter knives turning at a high speed and so coacting with one another as to remove the corners of said strips so as to form strips of circular section. These objects I attain as hereinafter set forth, reference being had to the accompanying drawings, in which:—

Figure 1, is a front elevation, partly in vertical section, of the mechanism comprising my invention; Fig. 2, is a side elevation of the mechanism shown in Fig. 1, and Fig. 3, is a perspective view of one of the cutters.

In the above drawings A and A' are a pair of substantially parallel shafts geared together by pinions $a$ and $a'$ of which one is driven from any desired source of power. These shafts are mounted in bearings, not shown, and carry upon adjacent ends a pair of cutters $b$ and $b'$, shaped as indicated. Each cutter may be described as consisting of a wheel body provided with a number of substantially radial slots $b^2$ between each two of which is a segmental section having a projecting tooth $b^3$ in which is formed a circumferentially extending slot of semi-circular section. These teeth cannot be of greater length than half the length of the segment of which they form a part and each one has its front or cutting edge immediately adjacent to one of the slots $b^2$ so that as the edges defined by the radial faces of the semi-circular grooves $b^4$, become dulled or nicked, they may be made sharp by the use of an abrading wheel in the manner well known in the art.

The two cutters $b$ and $b'$ are so mounted upon their respective shafts that the teeth of one come opposite the space between a tooth and a slot on the other; the proportions being such that the teeth of the two cutters together define a passage of circular outline.

In front of the two cutters, I mount two substantially vertical shafts C and C' geared together by pinions $c$ and $c'$ driven from any suitable source of power.

Each shaft is provided with a milled feeding wheel $c^2$, and while the shaft C' is mounted in fixed bearings, as shown, the shaft C is hung from its upper bearing $c^3$ in such manner as to permit its lower end, upon which is mounted its feeding wheel $c^2$, to be moved to a limited extent toward and from the other feeding wheel. This lower end of the shaft C is normally pressed toward the other shaft in any desired manner, such as by means of a spring $c^4$, and some form of stop is usually employed to prevent said two wheels from actually coming in contact with each other.

Under operating conditions, the shafts A and A' are turned at a high speed, as indicated by arrows in Fig. 2, while the shafts C and C' are also driven, but at a much slower speed. A strip of material D of square section is then fed between the wheels $c^2$ and as soon as this has entered for a sufficient distance it is engaged by the two cutters $b$ and $b'$. The edges of the teeth of said cutters cut off its corners so that it emerges from the machine circular in section, as indicated at $d$. The feed wheels $c^2$, by turning at a relatively slow speed, prevent the strip from being drawn through the machine by the cutter, as they compel it to pass at a predetermined rate so that said cutters are enabled to properly form it.

While I have shown cutters designed to form a strip of circular section, it is obvious that without in any way departing from my invention their circumferential grooves may be given such a form as to produce strips of any of a number of different sections.

I claim as my invention:

1. A machine for operating upon a strip of leather having two cutters co-acting to define a passage of predetermined form, and feeding mechanism for retarding the passage of a strip of material through said cutters, substantially as described.

2. A machine for operating upon a strip of leather having a pair of cutters together defining a passage of predetermined form and driven at a relatively high speed, with a pair of feed wheels turning at a speed less than that of the cutters for retarding the passage of the strip of material through said cutters, substantially as described.

3. The combination in a machine for operating upon a strip of leather, of a pair of cutters co-acting to define a passage of predetermined form, feed mechanism for retarding the movement of the strip of material under the action of the cutters, said feed mechanism including two shafts, each having a milled wheel, one of said shafts being mounted so as to be movable toward and from the other, substantially as described.

4. The combination in a machine for operating upon a strip of leather, of a pair of cutters having intermeshing teeth defining a passage of predetermined form, feed mechanism for regulating the passage of material through said cutters, the same including two substantially parallel shafts, each having a feed wheel, and means for regulating the movement of said shafts to cause the feed wheels to retard the passage of a strip of material between the cutters one of said shafts being yieldingly pressed toward the other, substantially as described.

5. A machine having mechanism for controlling the feeding of a strip of material, and two coacting cutters placed to operate upon the material supplied by said mechanism, said cutters having intermeshing teeth and substantially flat surfaces alternating therewith, said surfaces of one cutter being arranged to be opposite the ends of the teeth of the other cutter.

6. A machine having two cutters provided with intermeshing teeth and driven at a relatively high speed, said cutters each having substantially flat portions alternating with its teeth, and the teeth of each cutter being provided with a circumferential groove, the cutters having supporting means whereby the teeth of one cutter are caused to come opposite the flat surfaces of the other, said surfaces being arranged to support a piece of strip material directly opposite the point at which it is acted upon by the teeth of the other cutter.

7. A machine for operating upon a strip of leather having cutters co-acting to define a passage of predetermined form, means for driving the cutters, and feeding means placed to act on a strip of material before it is engaged by the cutters and tending to hold back on said material, substantially as described.

In testimony whereof, I have signed my name to this specification, in the presence of two subscribing witnesses.

ROBERT F. COLEMAN.

Witnesses:
 WILLIAM E. BRADLEY,
 WM. A. BARR.